(12) United States Patent
Matsuda et al.

(10) Patent No.: US 6,357,541 B1
(45) Date of Patent: Mar. 19, 2002

(54) CIRCULATION APPARATUS FOR COOLANT IN VEHICLE

(75) Inventors: Kenji Matsuda; Toyotaka Hirao; Hiroshi Mizutani, all of Nakamura-ku (JP); Gregory A. Major, Beverly Hills; June Bian, Novi, both of MI (US)

(73) Assignees: Mitsubishi Heavy Industries, Ltd., Tokyo (JP); General Motors Corporation, Detroit, MI (US)

( * ) Notice: Subject to any disclaimer, the term of this patent is extended or adjusted under 35 U.S.C. 154(b) by 0 days.

(21) Appl. No.: 09/326,602

(22) Filed: Jun. 7, 1999

(51) Int. Cl.[7] ............................................... B60K 11/00
(52) U.S. Cl. ........................................ 180/68.2; 165/43
(58) Field of Search .............................. 180/65.1, 68.2, 180/65.2, 65.4, 68.4, 68.1, 309; 123/41.01, 41.02, 41.51; 165/43; 237/12.3 B; 236/34, 34.5; 429/120, 62

(56) References Cited

U.S. PATENT DOCUMENTS

| | | | | |
|---|---|---|---|---|
| 3,110,633 A | * | 11/1963 | Bachmann | 136/161 |
| 4,598,687 A | * | 7/1986 | Hayashi | 123/563 |
| 5,255,733 A | * | 10/1993 | King | 165/39 |
| 5,497,941 A | * | 3/1996 | Numazawa et al. | 237/2 A |
| 5,549,153 A | * | 8/1996 | Baruschke et al. | 165/42 |
| 5,834,132 A | * | 11/1998 | Hasegawa et al. | 429/62 |
| 5,884,587 A | * | 3/1999 | Ichihara | 123/41.01 |
| 6,062,304 A | * | 5/2000 | Kremer et al. | 165/140 |
| 6,148,910 A | * | 11/2000 | Warner | 165/297 |

FOREIGN PATENT DOCUMENTS

| | | | | |
|---|---|---|---|---|
| GB | 2341830 A | * | 3/2000 | 180/65.2 |
| JP | 10238345 A | * | 9/1998 | 180/65.2 |
| JP | 11022466 A | * | 1/1999 | 180/65.2 |
| JP | 11313406 A | * | 11/1999 | 180/65.2 |

OTHER PUBLICATIONS

U.S. application No. 09/326,603, filed Jun. 7, 1999, pending, 0027-0037-3.
U.S. application No. 09/326,602, filed Jun. 7, 1999, pending, 0027-0038-3*.
U.S. application No. 09/326,610, filed Jun. 7, 1999, pending, 0027-0039-3.
U.S. application No. 09/326,601, filed Jun. 7, 1999, pending, 0027-0040-3.

* cited by examiner

Primary Examiner—Brian L. Johnson
Assistant Examiner—Gerald Klebe
(74) Attorney, Agent, or Firm—Oblon, Spivak, McClelland, Maier & Neustadt, P.C.

(57) ABSTRACT

A circulation apparatus for coolant in a vehicle, wherein a feature of the invention is that with a circulation apparatus for coolant in a vehicle, it is separated into a coolant circulation system having a first radiator 8 for an engine cooling, and a coolant circulation system having a second radiator 9 for electric motor and engine equipment cooling. With the second radiator 9, various apparatus to be cooled, namely the drive motor and engine equipment are cooled, and there is provided circulation quantity control devices 53, 54, 57 for controlling the quantity of coolant circulated to the various apparatus to be cooled.

6 Claims, 6 Drawing Sheets

| | ENGINE DRIVING | MOTOR DRIVING |
|---|---|---|
| ENGINE | ○ | × |
| I/C EGR SYSTEM | ○ | × |
| DRIVE UNIT | × | ○ |
| MOTOR-GENERATOR UNIT | ○/× (USED WHEN CHARGING) | ×/○ (USED WITH AIR CONDITIONER) |

○ ・・・ USE, × ・・・ NON USE

CIRCULATION APPARATUS FOR COOLANT IN VEHICLE

BACKGROUND OF THE INVENTION

1. Field of the Invention

The present invention relates to a circulation apparatus for coolant, provided in a vehicle for circulating coolant.

2. Description of the Related Art

Recently, there has been an increasing demand for introducing a low-pollution vehicle and alternative energy vehicle, accompanied with demands for improving the air environment and environmental problems. As a strong candidate for the alternative energy vehicle, there is the hybrid vehicle which uses an electric motor together with an engine.

A hybrid vehicle is driven by an engine at the time of high speed driving, and is driven by a drive motor with a battery as a power source at the time of low speed driving. The battery is charged by driving an electric power generation motor at the time of engine driving.

Since a plurality of drive sources are provided in this manner, then with the hybrid vehicle, cooling systems must be provided for each of the drive sources. That is to say, it is necessary to provide a coolant circulation apparatus for circulating coolant between a radiator and an engine as with the conventional engine to thereby cool the engine. Moreover, the drive motor is cooled by providing a coolant circulation apparatus for drive motor coolant. Furthermore, since it is necessary to cool the electric power generation motor while this is bring driven, then a coolant circulation apparatus is also required for this. Here with the drive motor and the electric power generation motor, the temperature must be maintained at less that around 65° C.

Moreover, in the case where a high temperature battery such as a lithium ion battery is used as the battery, then it is desirable to control the temperature to around 85° C. to improve the electric power generation and storage efficiency.

Incidentally, when using the drive motor and the electric power generation motor the cooling (control) temperature for the battery differs. Consequently, in addition to providing a cooling system which includes a radiator (referred to hereunder simply as a cooling system) for engine cooling, it is necessary to also provide respective separate cooling systems, one for cooling the drive motor and the electric power generation motor, and one for cooling the battery. Moreover, in the case where for example an intercooler is provided as engine equipment, then cooling of this must also be considered. Therefore, the cooling equipment is increased together with an increase in weight, so that there is the problem of mounting in a vehicle where miniaturization is required.

SUMMARY OF THE INVENTION

In view of the above situation, it is an object of the present invention to provide a circulation apparatus for coolant in a vehicle, which realizes miniaturization and weight reduction of equipment.

With the circulation apparatus for coolant in a vehicle of the present invention, then with a circulation apparatus for coolant in a vehicle incorporating; a radiator for cooling coolant, and an apparatus to be cooled, with a coolant circulated between the radiator and the apparatus to be cooled, the coolant is circulated between a single radiator and a plurality of apparatus to be cooled.

In a hybrid vehicle, for the apparatus to be cooled, then apart from the engine there is the drive motor, the intercooler, and the exhaust gas re-circulation (referred to hereunder as EGR) unit. However, these are not all used at the same time. For example, considering the intercooler and the drive motor, the intercooler is only used at the time of engine driving, and hence the intercooler and the drive motor are not used at the same time. That is to say, even if the cooling system for intercooler cooling and the cooling system for drive motor cooling are provided separately, since these cooling systems are not used at the same time, then cooling of the two can be performed by a single cooling system if the cooling systems are common for both the intercooler and the drive motor.

That is, the individually provided radiators can be combined and cooling performed in a centralized manner with one radiator, thereby minimizing the capacity of the radiators. Consequently, even if as with the present invention the construction is such that the coolant is circulated between a plurality of apparatus to be cooled and a single radiator, the weight and volume of the radiator can be reduced without reducing the cooling capacity.

More specifically, with the apparatus to be cooled as the engine, the drive motor, and the engine equipment, a first radiator is provided for engine cooling, and a second radiator is provided for drive motor and engine equipment cooling. For the engine equipment there is an intercooler, and/or an exhaust gas re-circulation unit.

Furthermore, a battery may be provided in the coolant circulation system having the second radiator.

With the circulation apparatus for coolant in a vehicle of the present invention, a circulation quantity control device for controlling the quantity of coolant circulated to the respective apparatus to be cooled, may be provided between the apparatus to be cooled and the radiator.

With this coolant circulation apparatus, a quantity of coolant necessary for the respective apparatus to be cooled is circulated by the coolant quantity control devices. That is to say, the respective coolant quantity control devices distribute the coolant fed from the radiator, to the respective apparatus to be cooled.

For the coolant quantity control device, there is provided pumps respectively provided for example for the apparatus to be cooled.

Here in the case where coolant is circulated from one radiator to a plurality of apparatus to be cooled, there is the case where if one pump is stopped, then when the other pump is operating, the coolant is not supplied to the radiator but flows back to the other apparatus to be cooled, the pump for which is stopped. In this case, the coolant is not circulated between the radiator but is circulated between the apparatus to be cooled, the pump for which is stopped. To prevent this, the pump is not completely stopped even in the case where it is not necessary to cool the apparatus to be cooled with coolant, and is operated to the extent that the coolant does not flow back.

As a means for preventing reverse flow, then instead of the above, the installation of a non-return valve may be considered. However, this has the problem that when the coolant is flowing, the non-return valve causes flow resistance. If the reverse flow is prevented with a circulation quantity control device such as a pump as described above, this problem does not arise, and the energy loss of the pump can be restrained. That is to say, rather than providing the non return valve, the construction where reverse flow is prevented by the pump enables a smaller pump, with a reduction in vehicle weight.

Moreover, a coolant heating device may be provided for heating the coolant, and a coolant mixture of a high temperature coolant heated by the coolant heating device and a coolant of a lower temperature than the high temperature coolant may be circulated to the apparatus to be cooled.

As a coolant heating device there is an apparatus such as the engine which heats the coolant. For the low temperature coolant, there is for example coolant which has been cooled by the radiator, or coolant which has been heated by the apparatus to be cooled.

By mixing the high temperature coolant and the low temperature coolant, then a coolant of an optional temperature within a range of the temperatures can be produced. Temperature control is performed by adjusting the quantity of high temperature coolant and low temperature coolant which are mixed together. In this way, for example a constant temperature coolant is continuously circulated to the apparatus to be cooled (for example the lithium ion battery) so that the apparatus to be cooled can be maintained a constant temperature.

DESCRIPTION OF THE PREFERRED EMBODIMENT

As follows is a description of a hybrid vehicle mounted with a circulation apparatus for coolant in a vehicle as one embodiment of the present invention, with reference to the appended drawings.

Figure 1:
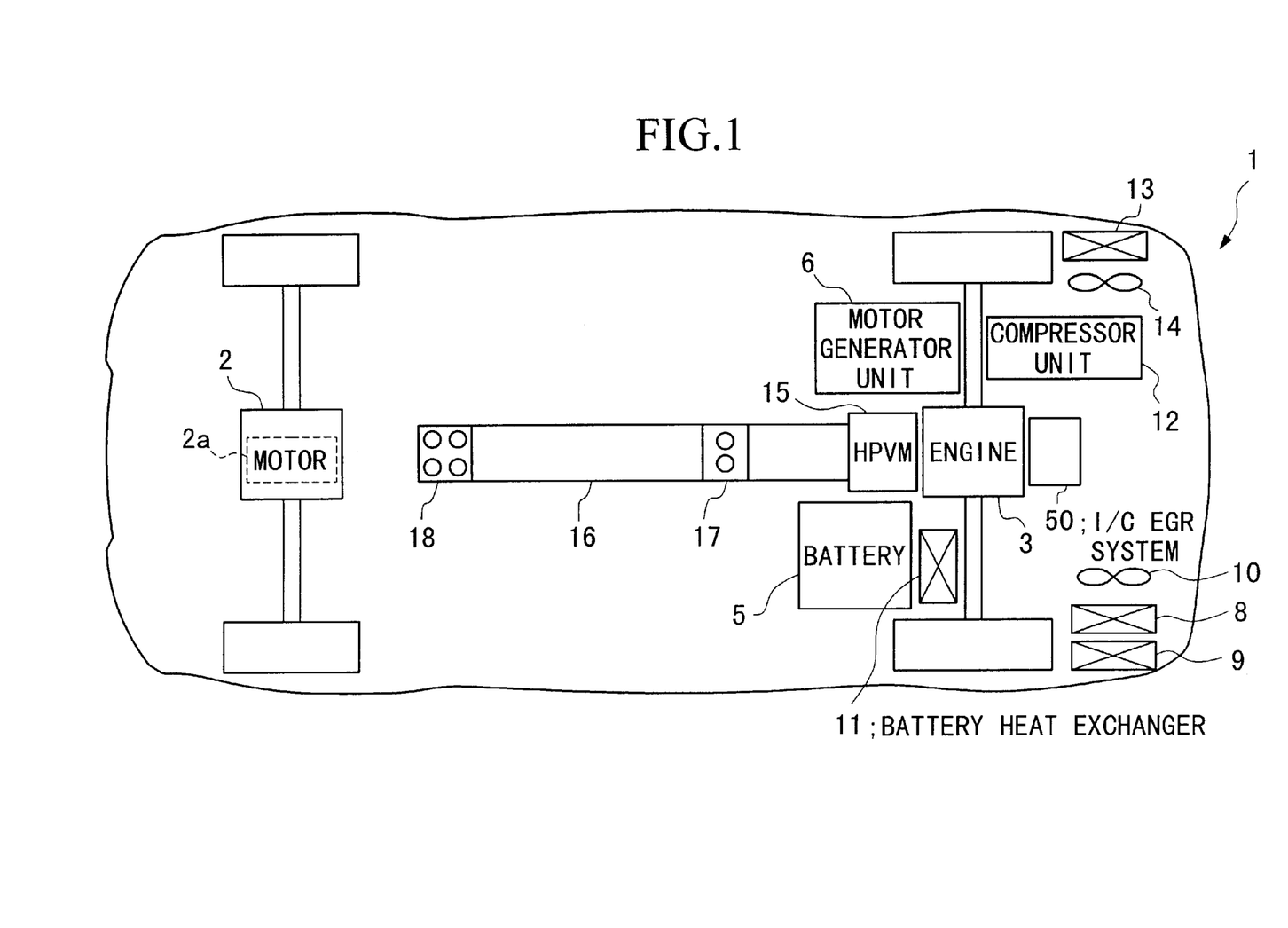
FIG. 1 is a diagram showing an arrangement of a hybrid vehicle mounted with a circulation apparatus for coolant in a vehicle, shown as one embodiment of the present invention.

In FIG. 1, numeral 1 denotes a hybrid vehicle, equipped with a drive unit 2 (apparatus to be cooled) in the front part of the vehicle having a motor 2a housed therein for driving front wheels, and an engine 3 in the rear part of the vehicle for driving rear wheels. The hybrid vehicle runs at the time of low speed driving, using the driving motor 2a as a drive source and runs at the time of high speed driving exceeding a certain speed, by switching the drive source to the engine 3. Since the motor 2a is provided in the front part of the vehicle, the engine 3 is arranged in the rear part of the vehicle, for the reason of mounting space and in consideration of air resistance.

In FIG. 1, numeral 5 denotes a battery (apparatus to be cooled) which is a power source for the motor 2a, and numeral 6 denotes a motor-generator unit (apparatus to be cooled) for converting the driving force of the engine 3 into electrical power and storing the electrical power in the battery 5. An electrical power generation motor (not shown) is mounted in the motor-generator unit 6, and electrical power is generated by transmitting the driving force of the engine 3 to the electrical power generation motor. Moreover, the motor-generator unit 6 has the function of converting electrical power stored in the battery 5 into the driving force, by driving the electrical power generation motor with the electrical power. Here the battery 5 of this example is a high temperature type battery which is stable in a high temperature range (for example 80° C. ~90° C.) with a high operating efficiency. As an example of a high temperature type battery, there is one which uses a halide of for example copper, nickel, or silver, for the positive electrode, and metallic lithium (alternatively an activated metal such as calcium, magnesium is also possible) for the negative electrode, and employs an organic substance such as propylene carbonate for the electrolyte.

Numeral 50 denotes an I/C (inter-cooler) EGR system (apparatus to be cooled).

Moreover, numeral 8 denotes a first radiator for cooling the engine 3, and 9 denotes a second radiator provided together with the first radiator 8. The second radiator 9 is for cooling the driving motor 2a, the motor-generator unit 6 and the I/C EGR system 50. The first radiator 8 and second radiator 9 are so constructed that heat is discharged to the surrounding air by a fan 10 for the cooling radiators.

Moreover, there is provided a battery heat exchanger 11 (coolant heating device) for transferring heat from the engine 3 to the battery 5.

Next is a description of an air conditioning apparatus (referred to hereunder as an air conditioner) mounted in the hybrid vehicle 1.

In FIG. 1, numeral 12 denotes a compressor unit for compressing a refrigerant, 13 denotes a heat exchanger, 14 denotes a fan for blowing air to the heat exchanger 13, and 15 denotes a module referred to as an HPVM (Heat Pump Ventilating Module). The heat exchanger 13 is provided on the right side of the vehicle body for facilitating heat exchange with outside air, and heat is forcibly exchanged with outside air by the fan 14. The HPVM 15 is arranged in the middle of the rear part of the vehicle body, and is connected to a duct 16 extending to the front of the vehicle body along a center of the lower part of the vehicle body. The duct 16 is formed in a tubular shape, and is provided with air outlet section 17 and 18 in the central portion and in the front end of the duct 16, respectively.

The HPVM 15 will now be described in detail.

Figure 2:
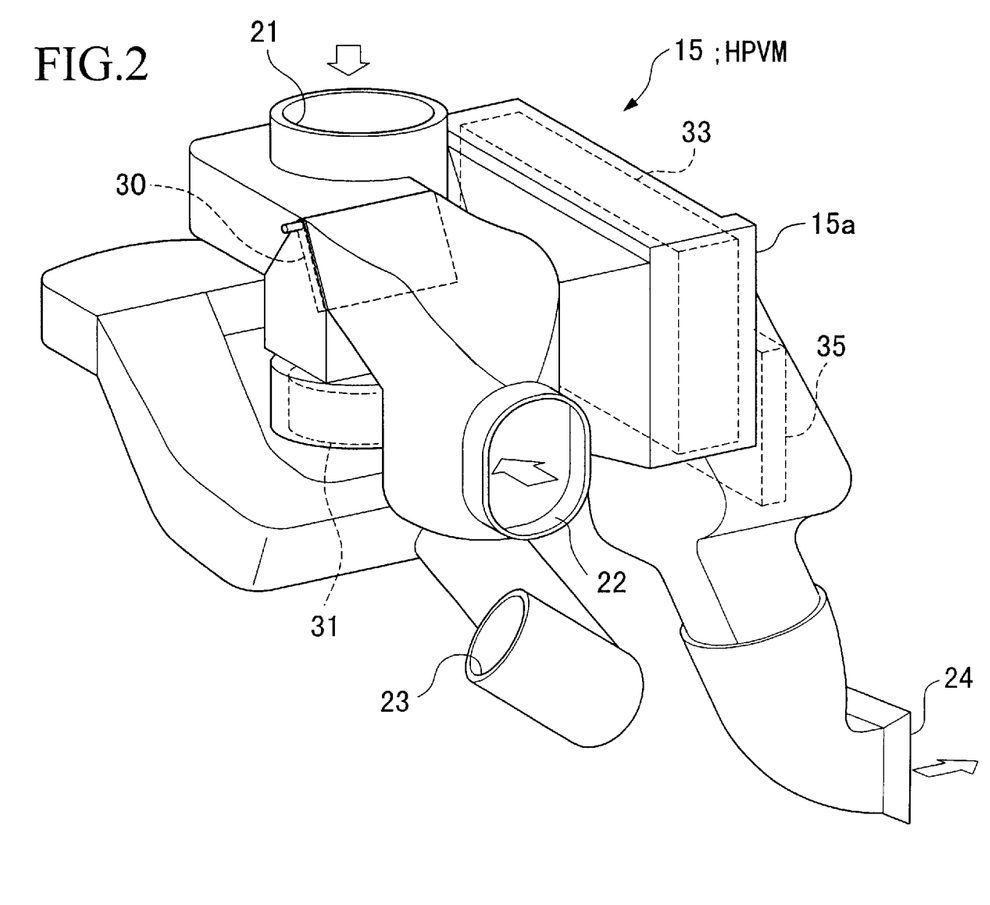
FIG. 2 is a perspective view of an HPVM mounted in the hybrid vehicle.
Figure 3:
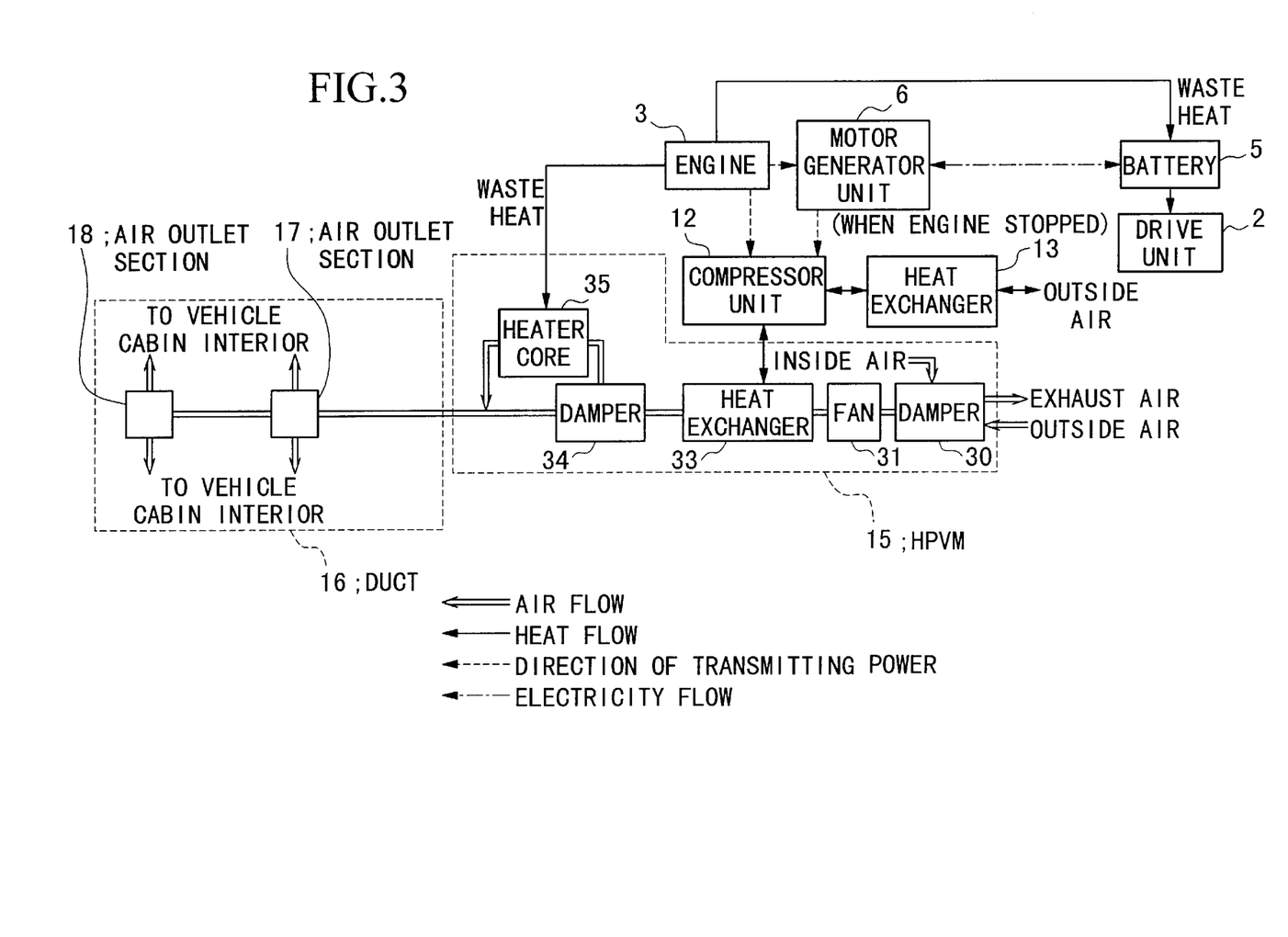
FIG. 3 is a block diagram of the hybrid vehicle.

FIG. 2 shows a perspective view of the HPVM 15, and FIG. 3 shows a block diagram of the air conditioner.

In FIG. 2, the HPVM 15 is constructed with a casing 15a, an inside air intake 21, an outside air intake 22, a discharge port 23 and a connecting portion 24 for connecting the HPVM to the duct 16.

The inside air intake 21 is communicated with the vehicle cabin, and the outside air intake 22 and the discharge port 23 are communicated with outside of the vehicle cabin.

Moreover, as shown in FIG. 3, the HPVM 15 is equipped with an inside air/outside air changeover damper 30 for determining which of either air inside of the vehicle cabin (inside air) or air outside of the vehicle cabin (outside air) is to be drawn in, a fan 31 for introducing air via the inside air/outside air changeover damper 30, a heat exchanger 33 for exchanging heat between the introduced air and the refrigerant, an air mix damper 34 for branching a part of the heat exchanged air, and a heater core 35 for heating the branched air.

By opening or closing the inside air/outside air changeover damper 30, it is possible to select either one of an inside air circulating operation for drawing in inside air from the inside air intake 21 (see FIG. 2) and sending the air to the duct 16, or an outside air introducing operation for introducing outside air from the outside air intake 22 (see FIG. 2) and sending the air to the duct 16, as well as discharging inside air from the discharge port 23 (see FIG. 2).

The heater core 35 is a heat exchanger for receiving a supply of high temperature coolant from the engine 3, as described below, and heating a flow of introduced air. This is used supplementarily at the time of the heating operation (heat pump operation) of the air conditioner. The air mix damper 34 is for adjusting the quantity of introduced air branched off to the heater core 35, according to the opening thereof.

The introduced air is then blown to the vehicle cabin from the air outlet sections 17 and 18 of the duct 16.

Figure 4:
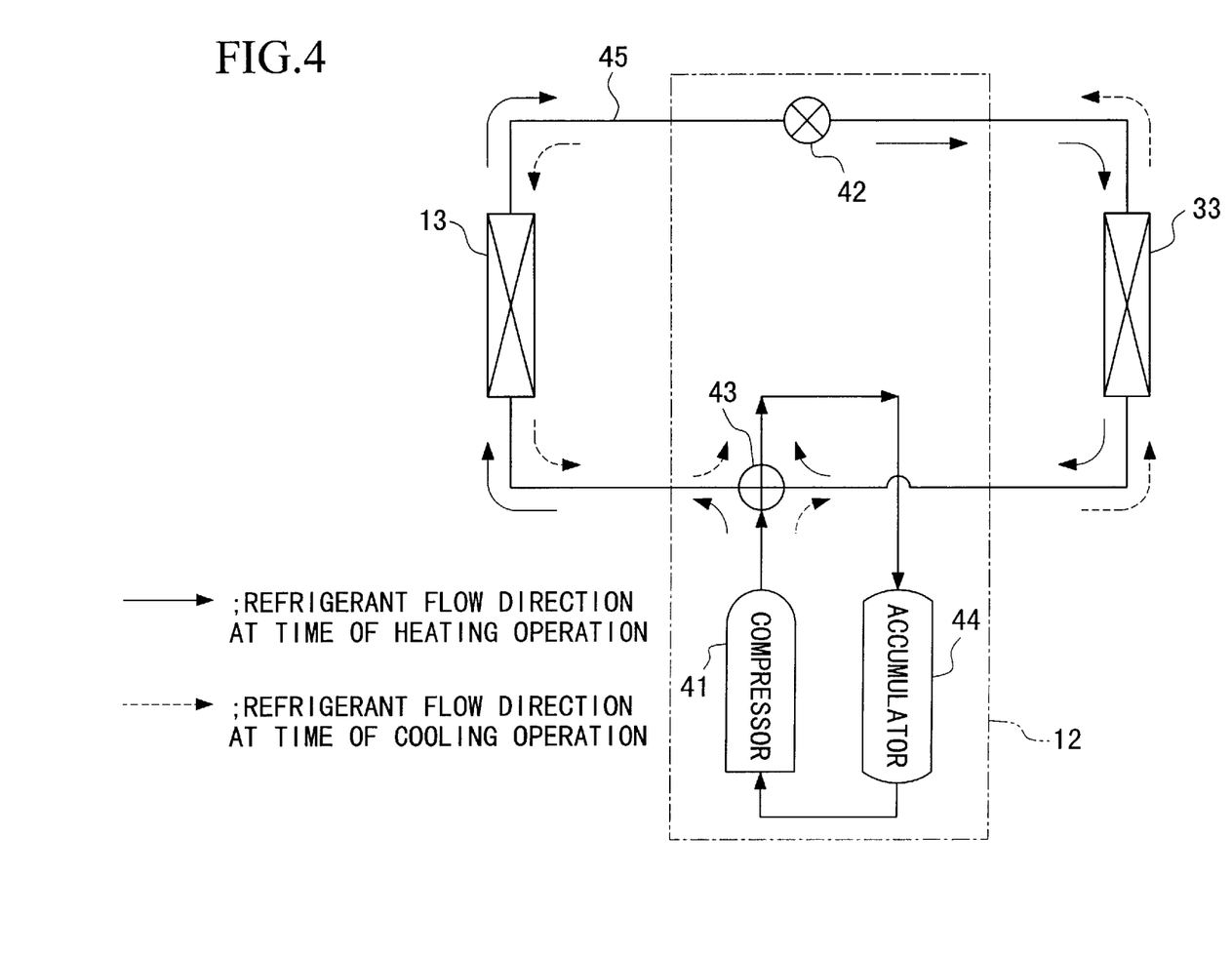
FIG. 4 is a diagram showing a refrigerant flow path of an air conditioner mounted in the hybrid vehicle.

The cooling operation or heating operation is effected by supplying refrigerant to the heat exchanger 33 and the heat exchanger 13 by the compressor unit 12. FIG. 4 shows the compressor unit 12.

As shown in FIG. 4, the compressor unit 12 includes, as main components, a compressor 41, a throttling resistance 42, a four way valve 43 and an accumulator 44. The above described heat exchangers 13 and 33 are connected between these respective devices by a refrigerant path 45 to form a refrigerant circuit.

A driving force is transmitted to the compressor 41 by the engine 3 or the motor-generator unit 6. The compressor 41 has the function of compressing the refrigerant supplied as a gas, and sending the refrigerant as a high temperature and high pressure gas refrigerant to the four way valve 43. The four way valve 43 to which the high temperature and high pressure gas refrigerant from the compressor 41 is sent has the function of changing over the cooling or heating operation by changing the refrigerant flow direction in the refrigerant circuit. Moreover, the throttling resistance 42 has the function of decompressing and expanding the high temperature and high pressure liquid refrigerant to give a low temperature and low pressure liquid (mist) refrigerant. This uses a capillary tube or an expansion valve. The accumulator 44 is provided for removing the liquid component contained in the gaseous refrigerant supplied to the compressor 41.

With the above described refrigerant circuit, at the time of the heating operation, the low temperature and low pressure liquid refrigerant is evaporated and gasified in the heat exchanger 33 by absorbing heat from outside air, to become a low temperature and low pressure gas refrigerant, and is then sent to the compressor 41 and is compressed into a high temperature and high pressure gas refrigerant. Thereafter, in the heat exchanger 13 the gas, refrigerant releases heat, and passes through the throttling resistance 42 to become a low temperature and low pressure liquid refrigerant, after which it is circulated again to the heat exchanger 33. In this case, the heat exchanger 33 functions as an evaporator while the heat exchanger 13 functions as a condenser.

At the time of the cooling operation, the high temperature and high pressure gas refrigerant is supplied to the heat exchanger 33, and hence is condensed and liquefied by discharging heat to the outside air to become a high temperature and high pressure liquid refrigerant which is sent to the throttling resistance 42, and the heat exchanger 13. The liquid refrigerant which has been evaporated in the heat exchanger 13 is then sent to the compressor 41 and is again circulated to the heat exchanger 33. In this case, the heat exchanger 33 functions as a condenser and the heat exchanger 13 functions as an evaporator.

With the above construction, for safe operation it is required that the temperature of the above described drive unit 2 and the motor-generator unit 6 is not higher than 65° C. Moreover, the temperature of the battery 5 is ideally 85±5° C. from the view point of storage efficiency. To satisfy this requirement, in the hybrid vehicle 1, the temperature of the coolant is controlled as described below.

Figure 5:
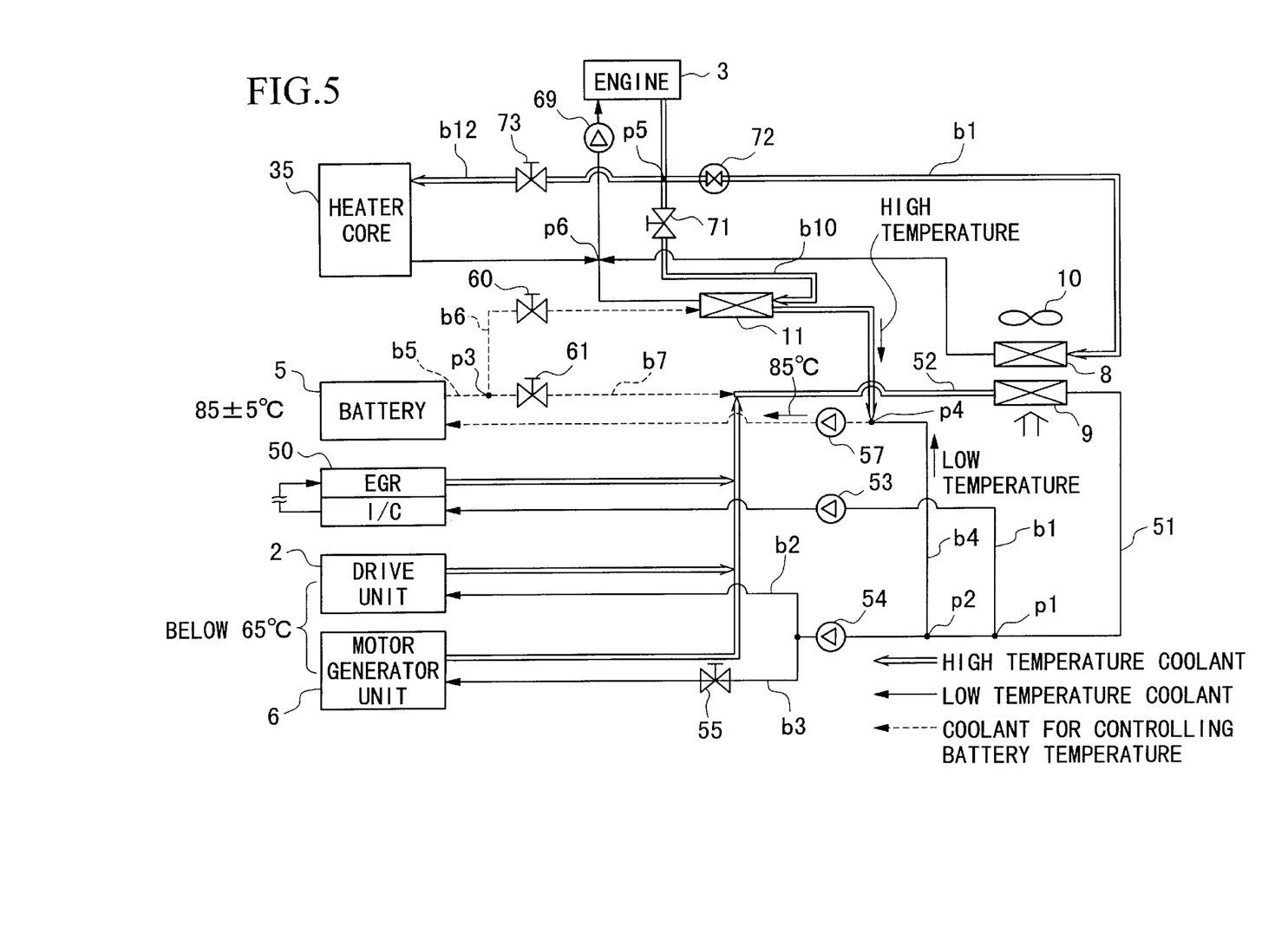
FIG. 5 is a diagram showing the flow of coolant in the hybrid vehicle.

As shown in FIG. 5, there are formed predetermined flow paths for flowing a coolant between the engine 3, the battery 5, the I/C EGR system 50, the drive unit 2, the motor-generator unit 6, the first radiator 8, the second radiator 9 and the battery heat exchanger 11.

The engine 3 is cooled by the first radiator 8, and the battery 5, the I/C EGR system 50, the drive unit 2 and the motor-generator unit 6 are cooled by the second radiator 9.

Next is a detailed description of the flow path.

The I/C EGR system 50, the drive unit 2 and the motor-generator unit 6 are cooled by a coolant supplied from the second radiator 9.

First, the coolant is supplied from the outlet side of the second radiator 9 to the flow path 51. The coolant is branched, at a branch point p1, to the I/C EGR system 50 side and the drive unit 2 and motor-generator unit 6 side.

The coolant branched to the I/C EGR system 50 side is supplied into the I/C EGR system 50 via an inter-cooler coolant pump (circulation quantity control device) 53 interposed in a flow path b1. After cooling the apparatus system in the I/C EGR system 50, the coolant is again circulated to the second radiator 9 via a flow path 52. At this time, a flow velocity is given to the coolant by the inter-cooler coolant pump 53 to make the coolant flow in the flow path b1.

On the other hand, the coolant branched to the drive unit 2 and the motor-generator unit 6 side is further branched at a branch point p2, after which a part of the coolant is further branched via a traction coolant pump (circulation quantity control device) 54. One part is branched to a flow path b2 on the drive unit 2 side, and the other is branched to a flow path b3 on the motor-generator unit 6 side. The coolant after branching is supplied to the drive unit 2 and the motor-generator unit 6, respectively, similar to the coolant supplied to the I/C EGR system 50, for cooling the apparatus system, and is then again circulated to the second generator 9 via the flow path 52. At this time, a flow velocity is given to the coolant by the traction coolant pump 54 to make the coolant flow in the flow paths b2 and b3.

Here, the drive unit 2 is disposed in the front part of the vehicle body, as shown in FIG. 1. On the other hand, the motor-generator unit 6 and the second radiator 9 are disposed in the rear part of the vehicle body. That is, the flow path b2 is longer than the flow path b3, and has a larger coolant flow resistance. Therefore, when it is necessary to make the coolant flow to both the drive unit 2 and the motor-generator unit 6, the flow rate on the motor-generator unit 6 side becomes higher than that on the drive unit 2 side, resulting in uneven balance. To solve this problem, a flow regulating valve 55 is interposed in the flow path b3 to maintain the flow rate balance with the flow path b2.

The other coolant branched at the branch point p2 flows to the battery 5 side in a flow path b4 in which a battery coolant pump (circulation quantity control device) 57 is interposed.

At a junction p4 before the battery coolant pump 57, this merges with a high temperature coolant heated by the heat of the engine 3. The high temperature coolant will be described later. The flow rate is adjusted beforehand so that after merging, the coolant attains a predetermined temperature (85±5° C.).

Thereafter, the coolant is supplied to the battery 5, and discharged to the outlet flow path b5, while maintaining the battery 5 within the above described predetermined temperature. The coolant is branched at a branch point p3 to flow paths b6 and b7. The construction is such that the flow path b6 passes through the battery heat exchanger 11 and joins the flow path b4 at the junction p4, and the flow path b7 joins the flow path 52 and is then circulated again to the second radiator 9. A flow regulating valve 60 is interposed in the flow path b6, and a flow regulating valve 61 is interposed in the flow path b7. The flow regulating valves will be described later.

The coolant flowing in the flow path b6 is heated by the heat of the engine 3 in the battery heat exchanger 11. In more detail, in the battery heat exchanger 11, heat is exchanged between the flow path b6 and the flow path b10 which circulates the coolant between the engine 3 and the battery heat exchanger 11. Since the temperature of the coolant in the flow path b10 heated by the engine 3 is higher than that of the coolant in the flow path b6 (85±5° C.), the coolant in the flow path b6 is heated to become a high temperature coolant, and merges with the low temperature coolant in the flow path b4 at the junction p4.

In this way, the high temperature coolant and the low temperature coolant merge at the junction p4, to thereby supply the above described coolant having a predetermined temperature to the battery 5. By adjusting the quantity of the high temperature coolant by the above described flow regulating valves 60 and 61, the temperature of the coolant supplied to the battery 5 is controlled.

Another flow path b11 to the engine 3 is provided independent of the above described flow path b10, to circulate the coolant between the first radiator 8 and the engine 3. Moreover, a flow path b12 is provided to circulate the coolant between the heater core 35 and the engine 3.

The coolant discharged from the engine 3 is branched at a branch point p5 to flow paths b10, b11 and b12, and passes through the battery heat exchanger 11, the first radiator 8 and the heater core 35, respectively, after which it merges at the junction p6, and is then circulated again to the engine 3.

An engine coolant pump 69 is provided in the flow path on the inlet side of the engine 3, to make the coolant flow in flow paths b10~b12. Moreover, in the flow paths b10 and b12 there are provided flow regulating valves 71 and 73, respectively, and in the flow path b11 there is provided a thermostat 72.

The first radiator 8 and the above described second radiator 9 are provided in parallel, and since the coolant flowing through the first radiator 8 has a higher temperature, a pull (suction) type radiator cooling fan 10 is arranged on the downstream side of the first radiator 8, so that air passing through the second radiator 9 passes through the first radiator 8.

Next is a description of the operation of the above described air conditioner.

As described above, the hybrid vehicle 1 travels at the time of low speed driving, using the driving motor 2a as a drive source and travels at the time of high speed driving exceeding a certain speed, by switching the drive source to the engine 3. Hence, the drive source of the air conditioner is also different from that of the conventional vehicular air conditioner.

First, when the hybrid vehicle 1 travels using the engine 3, the compressor unit 12 is driven by the driving force from the engine 3 at the time of air conditioning, to circulate the refrigerant between the heat exchangers 13 and 33. The engine 3 also transmits a driving force to the motor-generator unit 6, and the motor-generator unit 6 generates electrical power by a motor (not shown), and stores the electrical power in the battery 5.

With the HPVM 15, the fan 31 introduces inside air or outside air via the inside air/outside air changeover damper 30 to blow air to the heat exchanger 33. The heat of the introduced air is exchanged with the refrigerant in the heat exchanger 33, to thereby be heated (at the time of the heating operation), or cooled ( at the time of the cooling operation).

The air, after being heated is directed to the duct 16 or the heater core 35 by means of the air mix damper 34, and the introduced air sent to the heater core 35 is further heated by the waste heat of the engine 3 and then sent to the duct 16.

On the other hand, when the motor 2a is driving, operation is as follows. That is, the motor-generator unit 6 drives the electrical power generating motor housed therein, using the electrical power stored in the battery 5. The driving force is transmitted to the compressor unit 12 to thereby circulate the refrigerant between the heat exchangers 13 and 33. Other operation is similar to that when the engine 3 is driving.

Next is a description of the coolant circulation. As shown in FIG. 5, the coolant discharged from the second radiator 9 is distributed via the flow path 51 to the various apparatus, branching at branch points p1 and p2. That is to say, the quantity of coolant circulated to the battery 5 is determined by the battery coolant pump 57, and the quantity of coolant circulated to the I/C EGR system 50 is determined by the intercooler coolant pump 53, and the quantity of coolant circulated to the drive unit 2 and the motor-generator unit 6 is determined by the traction coolant pump 54.

Next is a separate description of the coolant circulation for when the engine 3 is driving, and for when the motor 2a is driving.

Figure 6:
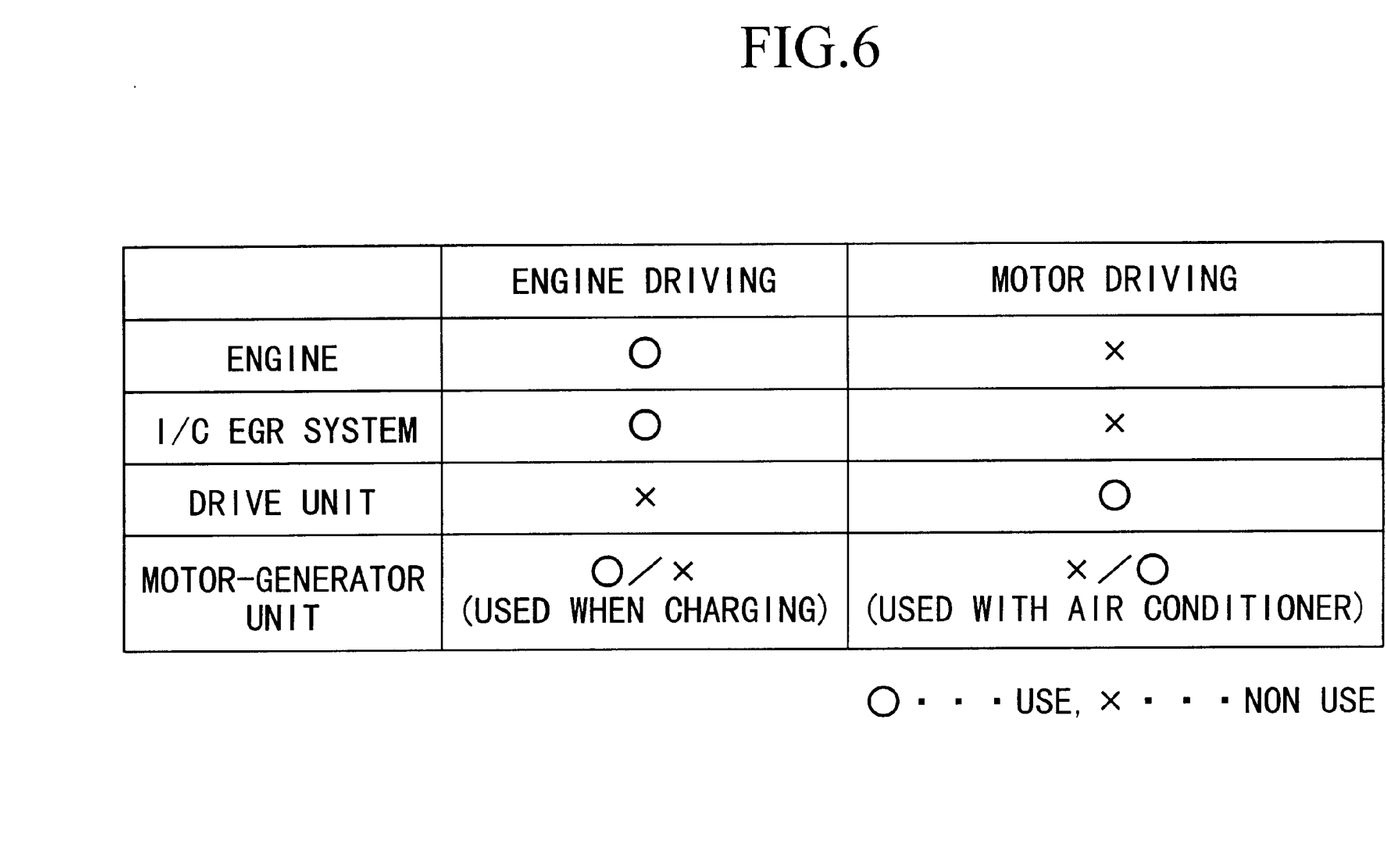
FIG. 6 is a table showing the use and non use of various equipment at the time of engine driving and motor driving in the hybrid vehicle

The respective apparatus which are used and which are not used when the engine 3a is driving and the motor 2a is driving are shown in FIG. 6.

When travelling using the engine 3, then as with the conventional engine vehicle, the coolant is circulated using the engine coolant pump 69, between the engine 3 and the radiator 8, to thereby cool the engine 3. Moreover, the coolant is also circulated in the I/C EGR system 50 using the intercooler coolant pump 53.

With the motor-generator unit 6, when the electric power generating motor housed therein is driven, the coolant is circulated. That is to say, in the case of storing electricity using the drive power of the engine 3, and in the case of operating the air conditioner when the engine 3 is stopped, the coolant is circulated to the motor-generator unit 6 using the traction coolant pump 54, to thereby cool the motor-generator unit 6.

On the other hand, when travelling by means of the motor 2a, the coolant is circulated to the drive unit 2 using the traction coolant pump 54 to thereby cool the drive unit 2.

Here, as shown in FIG. 6, it is not necessary to cool the I/C EGR system 50 when the motor 2a is driving. Consequently, it is not necessary to operate the inter-cooler coolant pump 53. Hence there is the case where when this pump is fully stopped, the coolant is made to flow back by the drive of another pump. For example, in the case where the inter-cooler coolant pump 53 is stopped and the traction coolant pump 54 is operating, the inter-cooler coolant pump 53 allows a reverse flow so that the coolant discharged from the drive unit 2 or the motor-generator unit 6 does not flow to the second radiator 9 but flows to the I/C EGR system 50. There is thus the case where a route is traced circulating again to the traction coolant pump 54 via the branch point p1.

In order to prevent this, the inter-cooler coolant pump 53 is operated even though cooling is not required for the I/C EGR system 50, to the extent that the abovementioned reverse flow does not occur.

Similarly, the traction coolant pump 54 is operated even in the case where cooling is not required for the drive unit 2 and the motor-generator unit 6, to the extent that reverse flow of coolant does not occur.

Moreover, the battery 5 is always maintained at a predetermined temperature irrespective of whether the engine 3 is driving or the motor 2a is driving. The battery coolant pump 57 is operated corresponding to a temperature change of the battery 5 so that high temperature coolant which has been adjusted in flow quantity by the flow control valves 60 and 61, and low temperature coolant are mixed at the junction point p4 to thereby maintain the temperature of the coolant circulated to the battery 5 continuously at a predetermined temperature.

The following effects are obtained with the present embodiment as described above.

The second radiator 9 alone cools the battery 5, the I/C EGR system 50, the drive unit 2 and the motor-generator unit 6. However since these battery 5, I/C EGR system 50, drive unit 2 and motor-generator unit 6 are not used at the same time, then the capacity and weight of the radiator can be reduced compared to providing radiators separately.

Moreover, since the circulation quantity to the various apparatus to be cooled is adjusted by the coolant pumps 53, 54 and 57, then the coolant quantity to the various apparatus can be independently controlled even though there is only one radiator. Flow control valves can be interposed in the various flow paths to control the flow quantity. However adjustment of the flow quantity with the various pumps enables a reduction in the flow resistance and hence energy loss of the pump can be restrained.

Furthermore, in the case where coolant is circulated to a plurality of apparatus from one radiator, and another pump is operated with one pump stopped, there is the case where the coolant flows back without flowing to the radiator. However by not completely stopping the pump even in the case where cooling is not required using coolant, but operating the pump to the extent that the coolant does not flow back, then reverse flow can be prevented.

As a means for preventing reverse flow, then instead of the above, the installation of a non-return valve may be considered. However, this has the problem that when the coolant is flowing, the non-return valve causes flow resistance. Since the construction is such as to stop the reverse flow using a pump as described above, then this problem does not occur and hence energy loss of the pump can be restrained.

Moreover, by mixing the high temperature coolant with the low temperature coolant, a coolant at a predetermined temperature can be supplied to the battery 5. Hence the battery 5 can be continually maintained at a predetermined temperature.

Here the circulation quantity control device may comprise a single pump and flow control valves interposed in flow paths to the various apparatus to be cooled. For example, instead of the pumps 53, 54 and 57 shown in the above mentioned embodiment, a single pump may be provided and the coolant quantity flowing to the various apparatus to be cooled controlled by flow control valves.

In this case, when coolant for an apparatus to be cooled is not required, the flow control valve interposed in that flow path can be closed to thereby prevent reverse flow of coolant.

The following effects are obtained with the circulation apparatus for coolant in a vehicle of the present invention as described above.

That is to say, by supplying coolant to a plurality of apparatus to be cooled from one radiator, the overall capacity and weight of the radiator can be reduced.

Since the circulation quantity to the respective apparatus is adjusted by the circulation quantity control devices, then the coolant circulation quantity to the respective apparatus can be independently adjusted even with a single radiator.

When coolant is circulated from one radiator to a plurality of apparatus, there is the case where if one circulation quantity control device is stopped and the other circulation quantity control device is operated, the coolant is not supplied to the radiator but flows back to the other apparatus to be cooled, the circulation quantity control device of which is stopped. In this case, the coolant is not circulated between the radiator but is circulated between the apparatus to be cooled, the circulation quantity control device of which is stopped. However if the circulation quantity control device is not completely stopped even in the case where the apparatus does not require coolant, but is operated to the extent that the coolant does not flow back, then the reverse flow can be prevented.

Moreover, by mixing the high temperature coolant and the low temperature coolant, then a coolant of an optional temperature within a range of the temperatures of the coolants can be produced. Hence by circulating the coolant after mixing, to the apparatus to be cooled (for example the lithium ion battery), the apparatus to be cooled can be maintained a constant temperature.

In the above manner, it is possible to miniaturize and lighten the circulation apparatus for coolant, so that miniaturization and weight reduction of the vehicle itself can be realized.

What is claimed is:

1. A coolant circulation apparatus in a vehicle having a driveline, comprising:
    an engine connected for providing power to the driveline and heating the coolant,
    a battery, and
    a coolant circuit which circulates a coolant mixture of a high temperature coolant heated by said engine and a coolant of a lower temperature than said high temperature coolant to said battery, said coolant circuit including a junction in which the high temperature coolant and the coolant of a lower temperature are combined to form said mixture.

2. The coolant circulation apparatus according to claim 1, further comprising a radiator for cooling the coolant of a lower temperature.

3. A circulation apparatus for coolant in a vehicle according to claim 1, wherein coolant heating means is provided for heating the coolant, and a coolant mixture of a high temperature coolant heated by said coolant heating means and a coolant of a lower temperature than said high temperature coolant is circulated to the apparatus to be cooled.

4. A circulation apparatus for coolant in a vehicle according to claim 2, wherein coolant heating means is provided for heating the coolant, and a coolant mixture of a high temperature coolant heated by said coolant heating means and a coolant of a lower temperature than said high temperature coolant is circulated to the apparatus to be cooled.

5. The coolant circulation apparatus according to claim 2, wherein said vehicle is a hybrid vehicle having an electric motor, said radiator being connected for cooling a coolant for said electric motor.

6. The coolant circulation apparatus according to claim 1, wherein said coolant circuit further comprises a battery coolant pump connected to pump the coolant mixture to the battery.

* * * * *

UNITED STATES PATENT AND TRADEMARK OFFICE
CERTIFICATE OF CORRECTION

PATENT NO.    : 6,357,541 B1                                              Page 1 of 1
DATED         : March 19, 2002
INVENTOR(S)   : Matsuda et al.

It is certified that error appears in the above-identified patent and that said Letters Patent is hereby corrected as shown below:

<u>Title page,</u>
Item [45], and the Notice information should read

-- [45]  Date of Patent:       *Mar. 19, 2002 --

-- [*]   Notice:      This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Third Day of September, 2002

Attest:

Attesting Officer

JAMES E. ROGAN
*Director of the United States Patent and Trademark Office*